(12) United States Patent  
Darensbourg et al.

(10) Patent No.: US 9,519,933 B2  
(45) Date of Patent: Dec. 13, 2016

(54) DELIVERY PAYMENT SYSTEMS

(75) Inventors: Rodney Darensbourg, Roswell, GA (US); Derrick Johnson, Atlanta, GA (US); Thomas Turney, Roswell, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 363 days.

(21) Appl. No.: 12/484,766

(22) Filed: Jun. 15, 2009

(65) Prior Publication Data

US 2009/0313143 A1 Dec. 17, 2009

Related U.S. Application Data

(60) Provisional application No. 61/061,415, filed on Jun. 13, 2008.

(51) Int. Cl.
| | |
|---|---|
| G06Q 10/00 | (2012.01) |
| G06Q 40/02 | (2012.01) |
| G06Q 10/08 | (2012.01) |
| G06Q 20/02 | (2012.01) |
| G06Q 20/10 | (2012.01) |
| G06Q 20/12 | (2012.01) |
| G06Q 30/04 | (2012.01) |

(52) U.S. Cl.
CPC ............ *G06Q 40/02* (2013.01); *G06Q 10/087* (2013.01); *G06Q 20/02* (2013.01); *G06Q 20/023* (2013.01); *G06Q 20/102* (2013.01); *G06Q 20/12* (2013.01); *G06Q 30/04* (2013.01)

(58) Field of Classification Search
None
See application file for complete search history.

(56) References Cited

U.S. PATENT DOCUMENTS

| | | | |
|---|---|---|---|
| 7,177,836 B1 * | 2/2007 | German et al. | 705/40 |
| 7,341,186 B2 | 3/2008 | Mrozik et al. | |
| 7,409,353 B1 * | 8/2008 | Uslontsev et al. | 705/330 |
| 7,426,492 B1 * | 9/2008 | Bishop et al. | 705/39 |
| 2002/0077978 A1 * | 6/2002 | O'Leary et al. | 705/40 |
| 2002/0099649 A1 * | 7/2002 | Lee et al. | 705/38 |
| 2002/0161707 A1 * | 10/2002 | Cole et al. | 705/42 |
| 2004/0089482 A1 * | 5/2004 | Ramsden et al. | 177/1 |
| 2004/0210531 A1 * | 10/2004 | Barron et al. | 705/44 |
| 2005/0055319 A1 * | 3/2005 | Monsen et al. | 705/401 |
| 2005/0192913 A1 * | 9/2005 | Lubart | 705/406 |
| 2006/0253339 A1 * | 11/2006 | Singh et al. | 705/26 |
| 2008/0033864 A1 * | 2/2008 | McDonough | 705/37 |
| 2008/0099552 A1 * | 5/2008 | Grillion | 235/380 |
| 2008/0162351 A1 * | 7/2008 | LaBadie et al. | 705/45 |
| 2011/0099121 A1 * | 4/2011 | Holley et al. | 705/333 |

* cited by examiner

*Primary Examiner* — Fateh M Obaid (74) *Attorney, Agent, or Firm* — Alston & Bird LLP (57) ABSTRACT

Various embodiments of the invention are directed to computer systems for facilitating payment for an item that is sent from a consignor to a consignee. In particular embodiments, the computer system facilitates an automatic, electronic transfer of payment for the item at a designated time that, for example, may be defined in relation to the delivery of the item to the consignee. For example, payment for the item may be electronically transferred to the consignor's bank account via a clearinghouse server at a designated time after delivery of the item, by a common carrier, to the consignee.

3 Claims, 6 Drawing Sheets

DELIVERY PAYMENT SYSTEMS

CROSS-REFERENCE TO RELATED APPLICATIONS

This application claims priority to U.S. Provisional Application No. 61/061,415, filed Jun. 13, 2008, which is hereby incorporated herein in its entirety by reference.

FIELD

Embodiments of the invention relate, generally, to the shipment of goods and, in particular, to a technique whereby payment for the shipment may occur automatically using a clearinghouse system.

BACKGROUND

One method that a consignee may use in order to pay for the shipment of goods received from a shipper (e.g., a consignor) is to provide the payment to the carrier responsible for delivering the shipment (e.g., UPS, FedEx, the United States Postal Service (USPS)) at the time of delivery. In addition to enabling customers to order goods without providing private credit card information to the shipper, this method, sometimes referred to as Collect on Delivery (COD), may provide somewhat of a compromise between the shippers and the consignees, whereby the shipper may desire to be paid as soon as possible, while the consignee may desire to delay payment as long as possible.

A need exists for a method of improving the COD process in a way that maintains this compromise yet enables shippers to simplify their accounts receivable process and post payments faster.

BRIEF SUMMARY

A computer system, according to various embodiments of the invention, is adapted for facilitating payment for an item that is delivered from a shipper to a consignee via a carrier. In particular embodiments, the computer system comprises: (A) a clearinghouse computer system that is configured to: (1) authorize a payment for delivery of an item through a transfer of funds from an account associated with a consignee to an account associated with a service provider that is associated with a shipper, the transfer occurring at a designated time following delivery of the item to the consignee; and (2) initiate the transfer of the funds at the designated time; and (B) an intermediary computer system in electronic communication with the clearinghouse computer system, the intermediary computer system being configured to: (1) receive a request from the shipper for a funds-transfer payment; (2) transmit the request to the clearinghouse computer system for authorization; (3) receive an indication of delivery of the item; and (4) notify the clearinghouse computer system to initiate the funds-transfer payment at the designated time.

An intermediary computer system according to particular embodiments of the invention is configured to: (A) receive a request from a shipper for payment for delivery of an item to a consignee through the transfer of funds from an account associated with the consignee to an account associated with a service provider associated with the shipper, the request including a designation of a time following delivery of the item for initiation of the funds-transfer payment; (B) receive an indication as to whether the funds-transfer payment is authorized; (C) generate, in response to receiving an indication that the funds-transfer payment is authorized, a confirmation code associated with the request; (D) transmit the confirmation code to the shipper and the consignee; (E) receive an indication that the item has been delivered; and (F) transmit, at the designated time following delivery of the item, a payment request to a clearinghouse computer system for initiation of the funds-transfer payment.

A carrier computer system according to various embodiments of the invention is configured to: (A) receive a request to ship an item, the request including a confirmation code, the confirmation code indicating that payment for delivery of the item should be made through the transfer of funds from an account associated with a consignee to an account associated with a service provider associated with a shipper; (B) link the confirmation code to one or more tracking numbers assigned to the item; (C) receive an indication that the item has been delivered; and (D) transmit a notification of delivery of the item to an intermediary computer system, the notification including the confirmation code and the tracking number associated with the item, such that the intermediary computer system can initiate the funds-transfer payment.

A clearinghouse computer system according to particular embodiments of the invention is configured to: (A) receive a request to authorize a payment for delivery of an item through the transfer of funds from an account associated with a consignee to an account associated with a service provider associated with a shipper at a designated time following delivery of the item; (B) determine whether the funds-transfer payment is denied, approved or not recommended; (C) transmit a response including an indication of whether the funds-transfer payment is denied, approved or not recommended; (D) receive a request to initiate the transfer of the funds at the designated time; and (E) establish a connection (e.g., an electronic connection) with a bank associated with the consignee and a bank associated with the service provider in order to transfer the funds.

BRIEF DESCRIPTION OF THE SEVERAL VIEWS OF THE DRAWINGS

Having thus described embodiments of the invention in general terms, reference will now be made to the accompanying drawings, which are not necessarily drawn to scale, and wherein:

DETAILED DESCRIPTION

Embodiments of the present invention now will be described more fully hereinafter with reference to the accompanying drawings, in which some, but not all embodiments of the inventions are shown. Indeed the invention may be embodied in many different forms and should not be construed as limited to the embodiments set forth herein. Rather, these embodiments are provided so that this disclosure will satisfy applicable legal requirements. Like numbers refer to like elements throughout.

Overview

Figure 1:
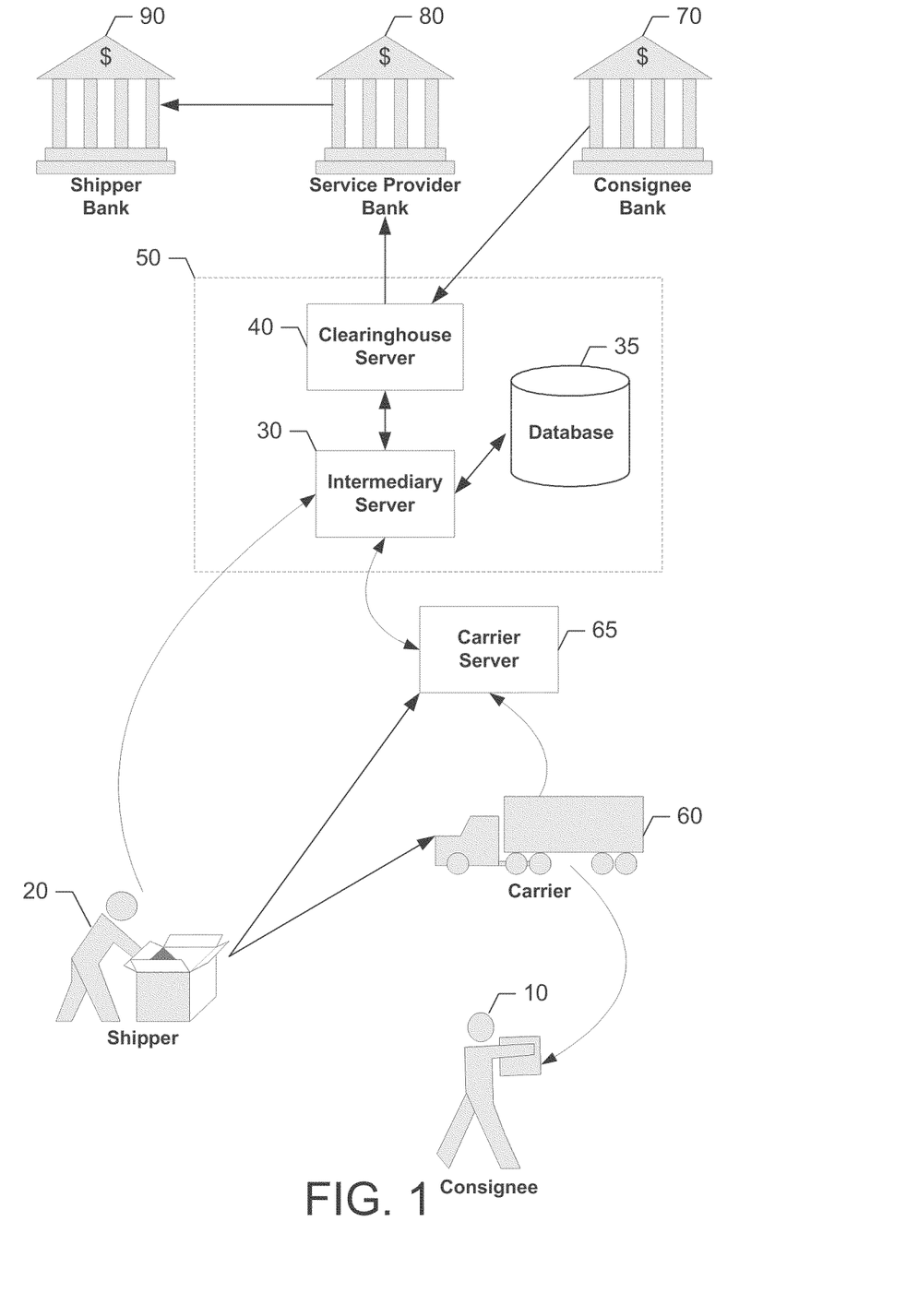
FIG. 1 is a block diagram of one type of system that may benefit from embodiments of the present invention.

In general, various embodiments of the present invention provide a delivery payment system 50, an example of which is shown in FIG. 1, and related methods and apparatuses, whereby payment for the shipment of goods from a shipper 20 (e.g., a retailer) to a consignee (e.g., a customer of the retailer) 10 may be made automatically at a time agreed to by the shipper 20 and the consignee 10 using a clearinghouse system. In particular, according to one embodiment, the shipper 20 and the consignee 10 may first agree that rather than, for example, having the consignee 10 pre-pay for the shipment of goods or pay via COD, the delivery payment system 50 will automatically transfer payment for the goods from the consignee's account at a specific time (e.g., shortly after the goods are delivered to the consignee). In response, the shipper 20 may seek authorization or, at a minimum, a recommendation as to whether it is advisable to allow this particular consignee 10 to use this form of payment. In one embodiment, the shipper 20 may do so by submitting a "Funds-Transfer Request," via, for example, a website or an application program interface (API) provided by an Intermediary server 30 responsible for facilitating use of the delivery payment system 50.

In one embodiment, the Intermediary server 30 may transfer the Funds-Transfer Request to a Clearinghouse server 40, which may use information associated with the consignee 10 (e.g., information regarding the validity of the consignee's bank account number, the amount of funds in the consignee's bank account, or the number of negative transactions associated with the consignee's bank account) as well as information regarding the shipper's desired level of risk, to either approve, deny, or not recommend the Funds-Transfer Request. Where the Funds-Transfer Request is denied, the shipper 20 and/or the Intermediary server 30 may notify the consignee 10 that another form of payment should be used. Alternatively, where the Funds-Transfer Request is not recommended by the Clearinghouse server 40, according to various embodiments of the present invention, the shipper 20 may decide whether to adhere to the Clearinghouse server's recommendation, or to override it. If the shipper 20 determines that it is willing to assume the risk associated with accepting payment via the delivery payment system 50, the shipper 20 may proceed as if the Clearinghouse server 40 had approved the Funds-Transfer Request.

In particular, if the Funds-Transfer Request is approved, or the shipper 20 overrides the Clearinghouse server's recommendation not to proceed, the Intermediary server 30 may generate and transmit to the shipper 20 a confirmation code associated with the Funds-Transfer Request. In one embodiment, the Intermediary server 30 may also transmit the confirmation code to the consignee 10.

At some point thereafter, the shipper 20 may initiate shipment of the goods associated with the Funds-Transfer Request. In particular, according to one embodiment, the shipper 20 may input information associated with the shipment of the item or items corresponding to the Funds-Transfer Request (e.g., ship to and from addresses, number of items, weight, requested service level) to a Carrier server 65 associated with the desired carrier (e.g., UPS, FedEx, United States Postal Service (USPS), etc.), and provide the item(s) to the carrier 60 for delivery. In one embodiment, the information input by the shipper 20 may include the Fund-Transfer confirmation code (e.g., a string of alphanumeric characters, or other confirmation indicia) received from the Intermediary server 30. In response, the Carrier server 65 may generate a tracking number for each item associated with the Funds-Transfer Request, and link those tracking numbers to the Funds-Transfer confirmation code received in a database associated with the carrier.

When the carrier 60 delivers one or more of the items to the consignee 10, the Carrier server 65 may notify the Intermediary server 30, which may then initiate payment for the shipment to the shipper 20 using the Clearinghouse server 40 and, in one embodiment, a bank associated with a party responsible for providing access to the delivery payment system 50 (this bank is referred to hereinafter as a "Service Provider Bank" 80, and may, in one embodiment, be the carrier). According to one embodiment, the shipper 20 may specify, for example in the Funds-Transfer Request submitted, a desired time at which payment should be made. This time may be defined, for example, in relation to the time at which one or more items are delivered to the customer. For example, the shipper 20 may request that payment be made at about (e.g., at) the time delivery of the item(s) that are to be paid for is confirmed. Alternatively, the shipper 20 may request that payment be delayed, for example, some predetermined amount of time (e.g., predetermined number of hours or days) following submission of the order or delivery of the item(s). As a result, upon receiving an indication from the Carrier server 65 that delivery has been made, the Intermediary server 30 may first check the desired timing of payment before initiating payment to the shipper 20.

At the designated time for payment, according to one embodiment, the Intermediary server 30 may transmit a Payment request to the Clearinghouse server 40. In response, the Clearinghouse server 40 may establish a connection with the consignee's bank 70 in order to debit the consignee's bank account the amount of payment required to cover the shipment. The Clearinghouse server 40 may further establish a connection with the Service Provider Bank 80 in order to credit the service provider the debited amount. The Service Provider Bank 80 may thereafter consolidate multiple scheduled inbound funds associated with the shipper 20 from one or more consignee banks before initiating a single payment or credit to the shipper 20 (e.g., a single credit to the shipper's bank account). In one embodiment, the payment or credit amount to the shipper 20 may be increased to reflect one or more fees or charges associated with use of the delivery payment system 50.

Exemplary System & Components

As shown in FIG. 1, and as discussed above, the system of one embodiment of the present invention may include a delivery payment system 50 for facilitating payment for a shipment of goods from a shipper 20 to a consignee 10. The delivery payment system 50 may include: (1) an Intermediary server 30 (discussed in detail below with regard to FIG. 2); (2) a database 35 stored on and/or accessible by the Intermediary server 30 and storing, for example, information associated with one or more shippers and their consignees; and (3) a Clearinghouse server 40 (discussed in more detail below with regard to FIG. 3). While not shown, the components of the payment delivery system 50 may be in electronic communication with one another and with the shipper 20 and/or the consignee 10 (e.g., with a personal computer (PC), laptop or similar electronic device associated with and/or operated by shipper 20 and/or the consignee 10) over the same or different wireless or wired networks including, for example, a wired or wireless Personal Area Network (PAN), Local Area Network (LAN), Wide Area Network (WAN), and/or the like.

While FIG. 1 illustrates the Intermediary 30 and the Clearinghouse servers 40 as separate, standalone entities, as one of ordinary skill in the art will recognize in light of this disclosure, embodiments of the present invention are not limited to this particular architecture. In contrast, the functionality described herein as being performed by the Intermediary 30 and Clearinghouse servers 40, individually, may occur on a single server, personal computer (PC), mainframe computer system, or the like, or on multiple centralized or distributed servers, computer systems, network entities, or the like.

The system of various embodiments of the present invention may further include a Carrier server 65 (discussed in more detail below with regard to FIG. 4) that is associated with a common carrier 60 (e.g., UPS, FedEx, the United States Postal Service (USPS)) and that is in communication with: (1) the shipper 20 (e.g., with a PC, laptop, etc., associated with the shipper 20); (2) the consignee 10 (e.g., with a PC, laptop, etc., associated with the consignee 10); and (3) the delivery payment system 50 to facilitate both the shipment of and payment for the items associated with the order. While not shown, the Carrier server 65 may be in communication with the shipper 20, consignee 10, and delivery payment system 50 via the same or different wired or wireless networks.

Finally, the system may further include the Consignee Bank 70, the Service Provider Bank 80 (e.g., a bank associated with the party responsible for providing access to the delivery payment system, which may, in one embodiment, be the carrier), and the Shipper Bank 90 in communication with each other and/or the delivery payment system 50 and, in particular, the Clearinghouse server 40, over the same or different wired or wireless networks. (It should be understood that such communication would typically occur between respective computer servers associated with these entities.) In various embodiments, this facilitates the ultimate transfer of funds from the consignee's bank account to the shipper's bank account (e.g., via the Service Provider Bank 80) for payment for the items delivered to the consignee by the common carrier. In various embodiments, this payment may include the price of the items, applicable taxes, and/or shipping-related charges.

Figure 2:
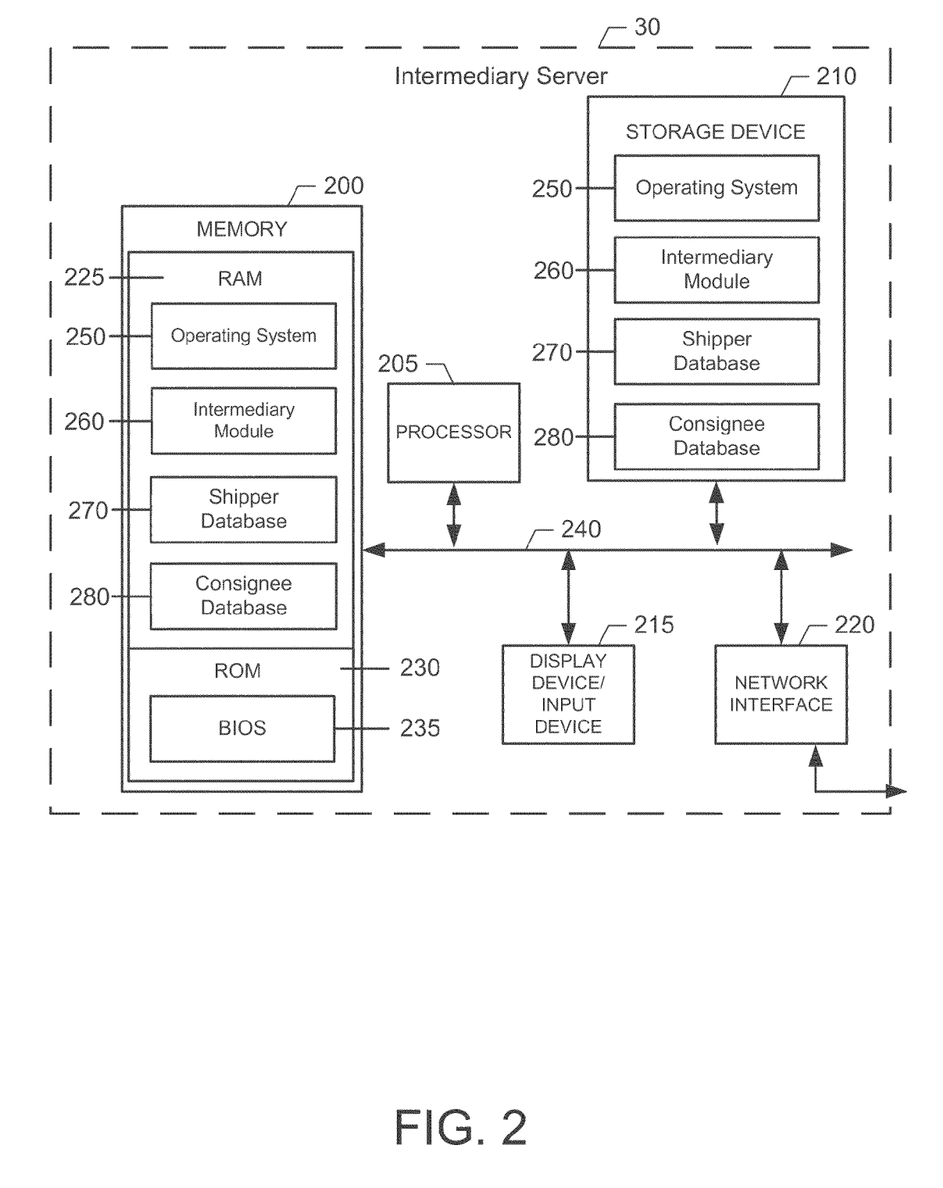
FIG. 2 is a diagram of an Intermediary server according to one embodiment.

Referring to FIG. 2, a schematic diagram of an Intermediary server 30 according to one embodiment of the invention is shown. As may be understood from this figure, in this embodiment, the Intermediary server 30 may include a processor 205 that communicates with other elements within the Intermediary server 30 via a system interface or bus 240. Also included in the Intermediary server 30 may be a display device/input device 215 for receiving and displaying data. This display device/input device 215 may be, for example, a keyboard or pointing device that is used in combination with a monitor. The Intermediary server 30 may further include memory 200, which may include both read only memory (ROM) 230 and random access memory (RAM) 225. The server's ROM 230 may be used to store a basic input/output system (BIOS) 235, containing the basic routines that help to transfer information between elements within the Intermediary server 30.

In addition, the Intermediary server 30 may include at least one storage device 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 may be connected to the system bus 215 by an appropriate interface. The storage devices 210 and their associated computer-readable media may provide nonvolatile storage for a personal computer. It is important to note that the computer-readable media described above could be replaced by any other type of computer-readable media known in the art. Such media may include, for example, magnetic cassettes, flash memory cards, digital video disks, and Bernoulli cartridges.

A number of program modules may be stored by the various storage devices and within RAM 225. Such program modules may include an operating system 250 and an Intermediary Module 260. The Intermediary Module 260 may control certain aspects of the operation of the Intermediary server 30, with the assistance of the processor 205 and an operating system 250. For example, as discussed in more detail below with regard to FIGS. 5A and 5B, according to one embodiment of the present invention, the Intermediary Module 260 may, among other things, generate and provide a website or an Application Program Interface (API) through which a shipper 20 may utilize the delivery payment system 50 to arrange for payment of a shipment to a consignee at a desired time. To further facilitate use of the delivery payment system 50, the storage device 210 and RAM 225 may further store a Shipper Database 270 and/or a Consignee Database 280 storing information associated with the shipper and its consignees, respectively. The information stored in the Shipper 270 and/or the Consignee 280 Database may include, for example, reports associated with the consignee (e.g., customer) that were generated automatically as a result of a transaction with the consignee and/or manually by the shipper.

Also located within the Intermediary server 30 may be a network interface 220, for interfacing and communicating with other elements of a computer network (e.g., the shipper 20, the Carrier server 65, and/or the Clearinghouse server 40).

Figure 3:
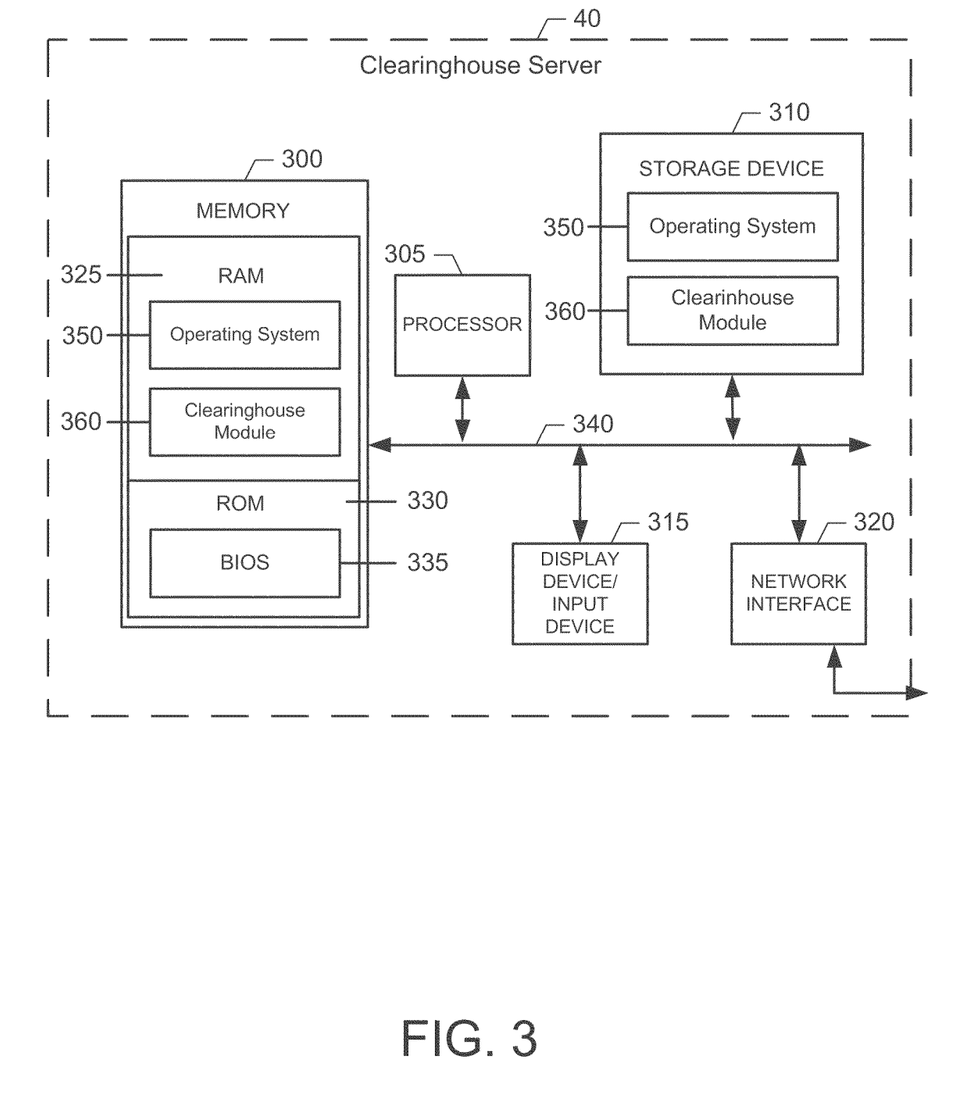
FIG. 3 is a diagram of a Clearinghouse server according to one embodiment.

FIG. 3 shows a schematic diagram of a Clearinghouse server 40 according to one embodiment of the invention. Similar to the Intermediary server 30, the Clearinghouse server 40 may include: (1) a processor 305 that communicates with other elements within the Clearinghouse server 40 via a system interface or bus 340; (2) a display device/input device 315; (3) memory 300 including both ROM 330 and RAM 325; (4) a storage device 310; and (5) a network interface card 320. The ROM 330 may store a BIOS 335, while the storage device 310 and RAM 325 may store an operating system 350 and a Clearinghouse Module 360, for controlling certain aspects of the Clearinghouse server 40, with the assistance of the processor 305. In particular, as discussed in more detail below with regard to FIGS. 5A and 5B, according to various embodiments of the present invention, the Clearinghouse Module 360 may be configured to receive and either deny, approve or not recommend Funds-Transfer Requests initiated by a shipper 20 in connection with shipment of goods to the consignee 10 and received, for example, from the Intermediary server 30. The Clearinghouse Module 360 may further be configured to receive payment requests from the Intermediary server 30 and, in response, to initiate a transfer of funds from the Consignee's Bank 70 to the Service Provider Bank 80 and, in one embodiment, ultimately, the Shipper's Bank 90.

It will be appreciated by one of ordinary skill in the art that one or more of the Intermediary server 30 and/or the Clearinghouse server 40 components may be located geographically remotely from other Intermediary 30 and/or Clearinghouse server 40 components, respectively. Furthermore, one or more of the components of either or both the Intermediary server 30 or the Clearinghouse server 40 may be combined within either the Intermediary 30 or the Clearinghouse 40 server, individually, or within a single delivery payment server, or similar entity, providing the functionality of all of the components described above with regard to FIGS. 2 and 3 combined. Additional components performing functions described herein may also be included in either or both the Intermediary 30 or the Clearinghouse server 40, or in a combined delivery payment server, or similar entity.

Figure 4:
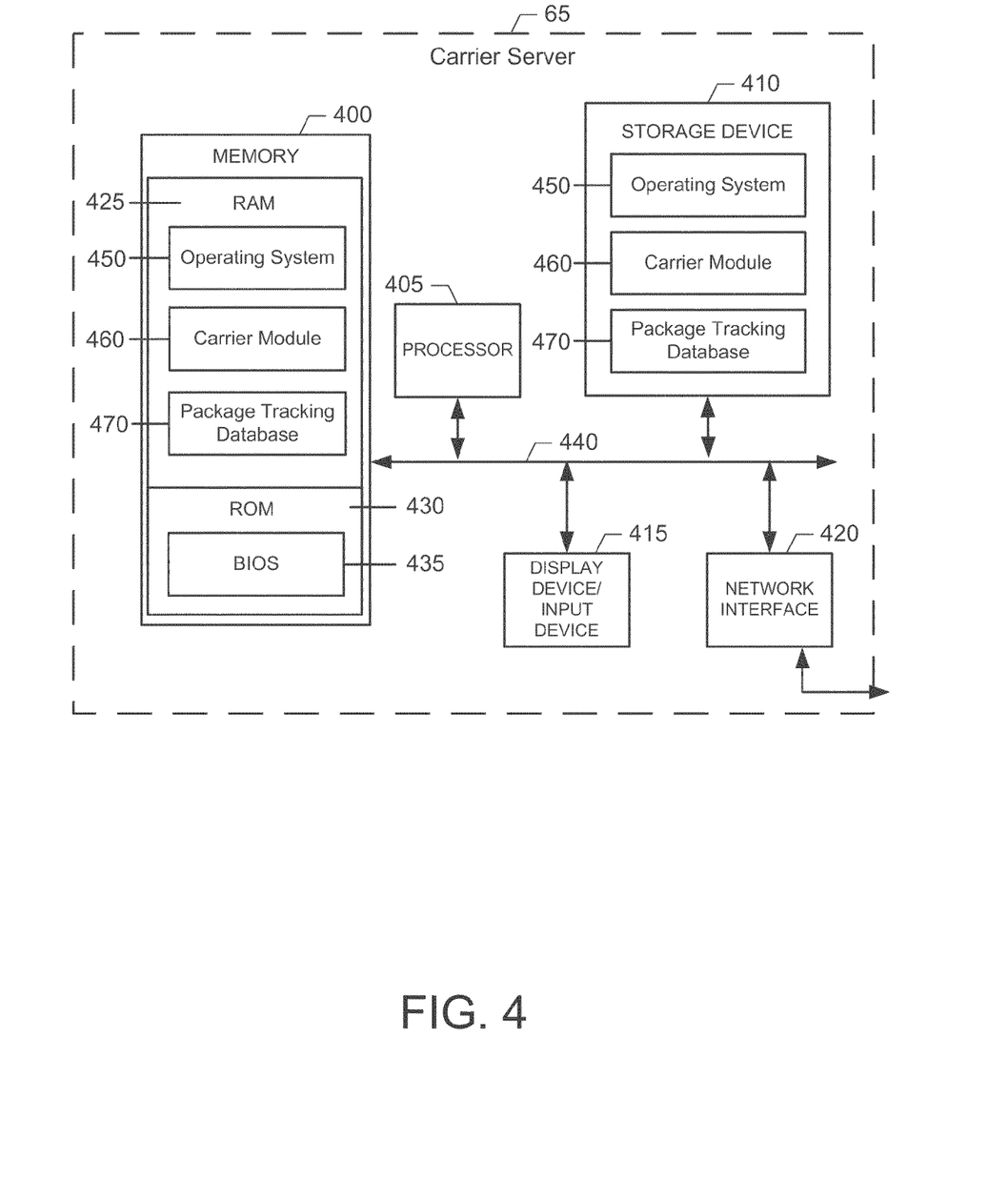
FIG. 4 is a diagram of a Carrier server according to one embodiment.

Finally, FIG. 4 shows a schematic diagram of a Carrier server 65 according to one embodiment of the invention. Similar to the Intermediary 30 and Clearinghouse servers 40, the Carrier server 65 may include: (1) a processor 405 that communicates with other elements within the Carrier server 50 via a system interface or bus 440; (2) a display device/input device 415; (3) memory 400 including both ROM 430 and RAM 425; (4) a storage device 410, and (5) a network interface card 420. The ROM 430 may store a BIOS 435, while the storage device 410 and RAM 425 may store an operating system 450 and a Carrier Module 460, for controlling certain aspects of the Carrier server 65, with the assistance of the processor 405. In particular, as discussed in more detail below with regard to FIGS. 5A and 5B, according to one embodiment, the Carrier Module 460 may be configured to match one or more tracking numbers associated with initiated shipments to Funds-Transfer Requests received from the Intermediary server 30 and to pass this information back to the Intermediary server 30. The Carrier Module 460 may further be configured to notify the Intermediary server 30 when shipments associated with the matched tracking numbers have been completed, such that the Intermediary server 30 can initiate payment for the shipment at the time requested by the shipper 20. To facilitate this process the storage device 410 and RAM 425 may further store a Package Tracking Database 470 that stores information (e.g., tracking and confirmation codes, where applicable) associated with initiated item deliveries.

It will be appreciated by one of ordinary skill in the art that one or more of the Carrier server 65 components may be located geographically remotely from other Carrier server 65 components. Furthermore, one or more of the components may be combined, and additional components performing functions described herein may be included in the Carrier server 65

While the foregoing description of FIGS. 2-4 describes an Intermediary, Clearinghouse and Carrier "server," as one of ordinary skill in the art will recognize in light of this disclosure, embodiments of the present invention are not limited to a client-server architecture. In contrast, any central or distributed computer or network system may likewise be used to perform the functionality described herein without departing from the spirit and scope of embodiments of the present invention.

Process of Using a Funds Transfer on Delivery System

Figure 5A:
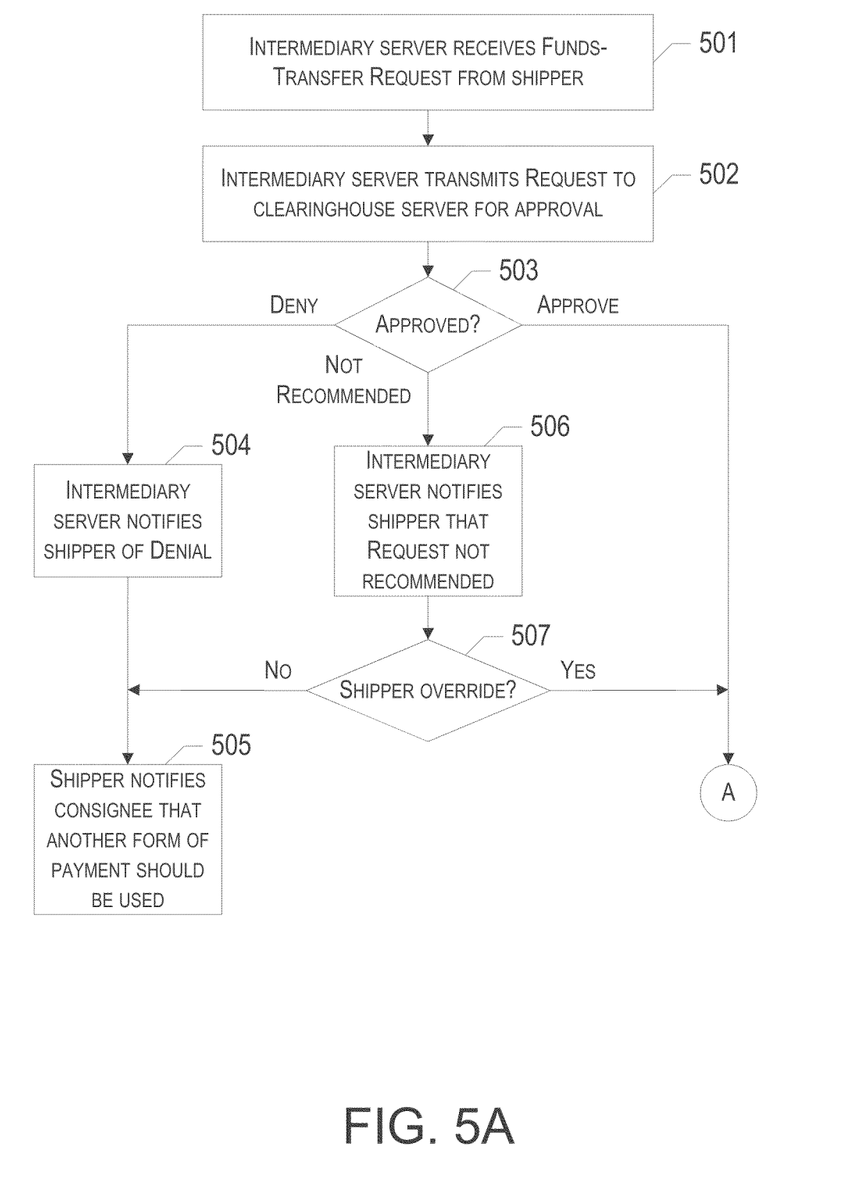
FIGS. 5A and 5B are flow charts illustrating operations that may be performed in order to use the delivery payment system in accordance with embodiments of the present invention.
Figure 5B:
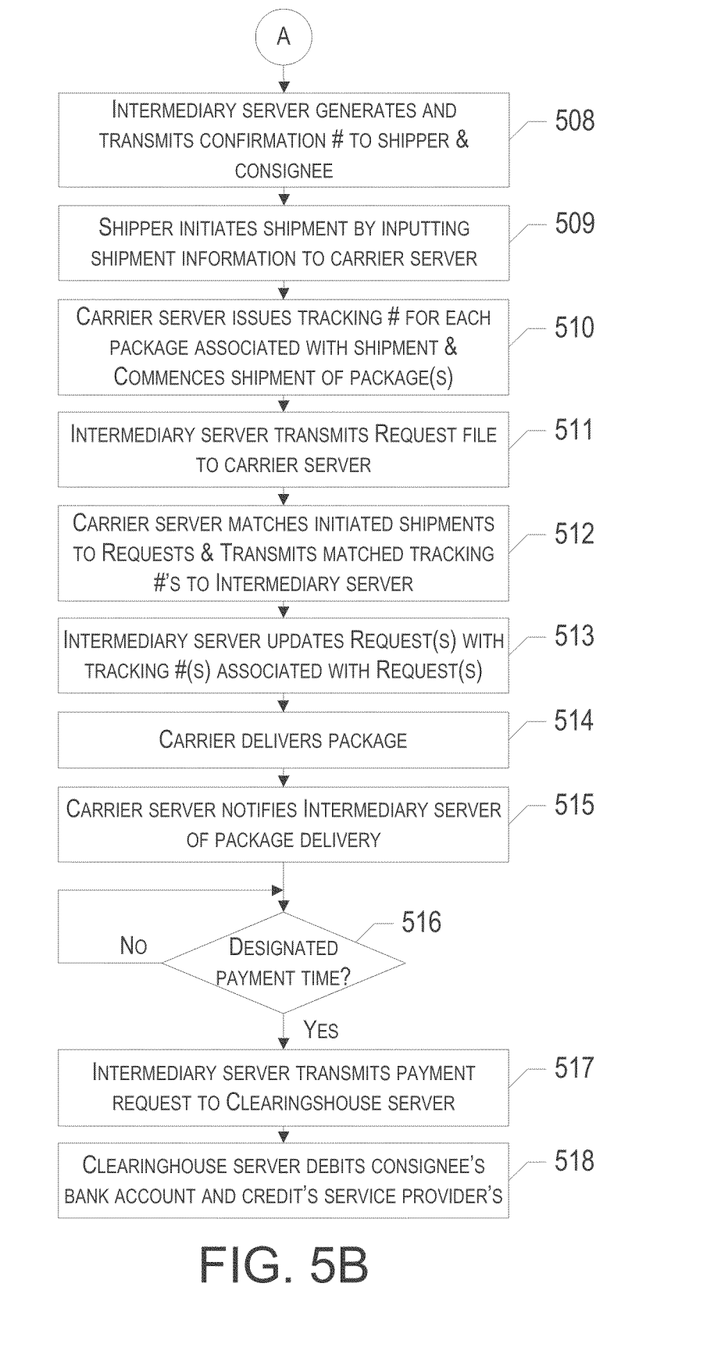

Referring now to FIGS. 5A and 5B, operations are illustrated that may be taken in order to utilize the delivery payment system 50 described above for payment for a shipment of goods from a shipper (e.g., a vendor) to a consignee (e.g., customer). The shipment may involve a single item or multiple items associated with the same order. As discussed above, the process may begin when the shipper and the consignee agree to use the delivery payment system 50 for payment of the shipment instead of, for example, pre-payment or use of a standard Collect-on-Delivery (COD) system. In one embodiment, the consignee may have requested that this particular method of payment be used and, in doing so, provide the shipper with any information necessary to initiate the process (e.g., bank account number, American Bankers Association (ABA) routing number). Regardless of which party initially requested use of the delivery payment system 50, upon deciding to use the delivery payment system 50, the shipper may submit a Funds-Transfer Request, which may be received by the Intermediary server 30 at Block 501 and stored in the database accessible by the Intermediary server 30. In one embodiment, the Intermediary server 30 may continue to store the Funds-Transfer Request, along with all Requests received from this and other shippers, for at least two years.

In one embodiment, submitting the Funds-Transfer Request may involve accessing a website or an Application Program Interface (API) provided by the Intermediary server 30 and inputting information associated with the shipment. This information may include, for example, the shipper and consignee's identity, the value of the shipment, the shipper's and the consignee's bank account information (e.g., account number, ABA routing number), and/or any other information which can be used to uniquely identify the shipment as well as verify the credit status of the consignee.

As noted above, in one embodiment, the Intermediary server 30 may maintain a database 35 including information associated with previous consignees associated with the shipper. The information associated with each consignee may be updated automatically each time the delivery payment system 50 is used in connection with that consignee, and/or the shipper may provide updated information at any time including batch uploads. In such embodiments, the shipper may need only access the website or API, locate the consignee for this particular shipment within the database, and then input the dollar amount associated with the shipment.

In one embodiment, the shipper may submit the Funds-Transfer Requests in real-time in association with each individual order. Alternatively, batched submissions may be made, for example, at the end of each day or week.

In one embodiment, the Funds-Transfer Request may also include an indication of the payment schedule that the shipper would like to use with respect to this particular shipment. In particular, the shipper may indicate when it would like the consignee to be charged for the shipment. For example, the shipper may designate that it would like to receive payment prior to, immediately upon, or shortly after, delivery of a particular item (e.g., a first delivered or last delivered item) of the shipment. Alternatively, the shipper may request that payment be made upon delivery of the last item of the shipment. As yet another example, the shipper may provide a certain number of days (or other time period) following initiation of shipment or delivery of the first or last item for payment. For example, the shipper may indicate that payment should be made 30 days following initiation of shipment of the order.

As another example, the shipper (or other entity) may indicate that payment should be made on a particular day of the month after the delivery of a particular item. For example, the system may be set up to automatically transfer any unpaid payments that are due to a particular shipper on the $15^{th}$ day of each month. In such an embodiment, on the $15^{th}$ day of each month, the system would typically automatically coordinate payment to the consignor's bank account (e.g., in the manner described below) for any items that have been delivered from the consignor to the consignee, provided that payment for that item has not already been made.

In one embodiment, the shipper may modify this information at any time up to one day prior to initiation of payment (e.g., one day before the consignee's bank account is debited). This feature may be used, for example, if the consignee requests that payment be delayed for some reason.

The Intermediary server 30 may, at Block 502, transmit the Funds-Transfer Request to the Clearinghouse server 40 for approval. In particular, the Intermediary server 30 may transmit the Funds-Transfer Request to the Clearinghouse server 40, such that the Clearinghouse server 40 can evaluate the risk associated with using the delivery payment system 50 for payment by the consignee and in association with this particular shipment. According to one embodiment, the Clearinghouse server 40 may either approve, deny, or not recommend the transaction based on any of a number of factors including, for example: (1) whether the consignee has a valid bank account; (2) whether the consignee has money in its account and, if so, how much; and/or (3) whether there is an unfavorable history associated with the consignee stemming from previous transactions performed by the consignee. In one embodiment, in order to obtain information to assist in making the determination to approve, deny or not recommend the transaction, the Clearinghouse server 40 may access a Negative Check Database to obtain information regarding return item frequency (e.g., evidenced by checks returned due to insufficient funds) over a given period of time.

In one embodiment, the Intermediary server 30 may provide the Clearinghouse server 40 with details regarding the shipper's particular appetite for risk. In other words, the Intermediary server 30 may provide the Clearinghouse server 40 with the criteria that should be used (e.g., minimum dollar amount in the bank account, maximum number of negative transactions previously conducted) in order to approve, deny or not recommend a Funds-Transfer Request. The Intermediary server 30 may store this information in the database 35 in association with the shipper. In one embodiment, the criteria may be industry, rather than shipper, specific. In other words, all shippers falling within a particular industry may maintain the same criteria for approving, denying and not recommending Funds-Transfer Requests.

As noted above, according to one embodiment, after receiving a particular Funds-Transfer Request, the Clearinghouse server 40 may approve, deny or "not recommend" the requested transaction. If, at Block 503, the Clearinghouse server 40 denies the Funds-Transfer Request, the Clearinghouse server 40 may notify the Intermediary server 30, which, in turn, may notify the shipper of the denial (at Block 504). In response, the shipper may notify the consignee that another form of payment should be used. (Block 505). In one embodiment, the Intermediary server 30 may also notify the consignee via, for example, email, fax, text message, or the like, that the Request was not approved and provide a reason. The Intermediary server 30 may further update the Consignee Database 280 to indicate that this particular Request was not approved and why.

On the other hand, if the Clearinghouse server 40, at Block 503, indicates that the requested transaction, while not denied, is not recommended, according to one embodiment of the present invention, the shipper may have a choice as to how to proceed. In particular, the Clearinghouse server 40 may notify the Intermediary server 30, which, in turn, may notify the shipper of the decision not to recommend the transaction (at Block 506). In response the shipper may decide, at Block 507, whether to override the Clearinghouse server's recommendation. If the shipper does follow the Clearinghouse server's recommendation, the shipper may proceed as if the Funds-Transfer Request had been denied, and notify the consignee, at Block 505, that another form of payment should be used. Alternatively, if the shipper decides to override the Clearinghouse server's recommendation, the shipper may proceed as if the Funds-Transfer Request had been approved, a process which is illustrated in FIG. 5B. In one embodiment, however, overriding the Clearinghouse server's recommendation may result in the shipper losing any guarantee on receiving payment for the items shipped. Such a guarantee may be provided, for example, by the delivery payment system, the carrier, or some other third-party insurer.

By enabling the shipper to override the Clearinghouse server's recommendation not to use the delivery payment system 50 for payment of the shipment, certain embodiments of the present invention provide shippers with the ultimate decision as to what level of risk the shippers are willing to assume. By providing this flexibility, shippers may be better able to make exceptions for certain consignees, for example, who have, in their opinion, though not necessarily on paper, been trustworthy in the past. It may also provide for more fine-tuned filtering of consignees, so that consignees who might ordinarily be approved can be looked at more carefully by the shipper.

Turning now to FIG. 5B, if the Clearinghouse server 40, at Block 503, approves the Funds-Transfer Request, or the shipper overrides the Clearinghouse server's recommendation not to proceed, the Intermediary server 30 may, at Block 508, generate and transmit a confirmation code associated with the Funds-Transfer Request to the shipper and the consignee. In one embodiment, the confirmation code, which may be transmitted via an Internet site, email, fax, text message, or the like to the consignee, may be accompanied by the cost of the shipment, as well as the terms and conditions of the shipment. For example, the terms and conditions may include the payment schedule designated by the shipper in the Funds-Transfer Request (e.g., 30 days from initiation of shipment).

In various embodiments, at some point in time after receiving the confirmation code, the shipper may, at Block 509, initiate shipment of the item or items associated with the Funds-Transfer Request submitted. In particular, according to one embodiment, the shipper may upload shipping information to the server 65 that is associated with a particular carrier (e.g., USP, FedEx, United States Postal Service (USPS)). In addition to including information, such as the ship to and from addresses, number and weight of parcels, requested level of service, and/or the like, according to one embodiment, the shipper may also upload the confirmation code received from the Intermediary server 30.

Upon receipt of the shipping information, the carrier may, at Block 510, issue a tracking number for each item included in the shipment order (and, therefore, associated with the issued Funds-Transfer confirmation code) and commence shipment of the items. The Carrier server 65 may thereafter maintain, for example, in the package tracking database 470, entries for each item in route, or soon to be in route, that includes the tracking number, as well as a Funds-Transfer confirmation code (e.g., in a reference number field), if applicable.

According to one embodiment of the present invention, the Intermediary server 30 may periodically transmit a "Requests File" including a list of all Funds-Transfer Requests received by the Intermediary Server 30 that have not been matched to actual shipments. (Block 511). In one embodiment, the Requests File may include information identifying the shipper and the consignee, as well as the Funds-Transfer confirmation code associated with each Funds-Transfer Request. In an alternative embodiment, the Requests File may include (e.g., only include) a list of confirmation codes corresponding to the received Funds-Transfer Requests. As one of ordinary skill in the art will recognize from this disclosure, the Intermediary server 30 may transmit the Requests File as frequently as desired depending, for example, upon the quantity of requests received.

Upon receiving the Requests File, the Carrier server 65 may, at Block 512, match the Funds-Transfer Requests identified in the Requests File to shipments that have been initiated. In particular, according to one embodiment, the Carrier server 65 may use the confirmation codes included in the Requests File to access the package tracking database 470 to identify one or more items and, in particular, item tracking numbers that are associated with each confirmation code. In other words, the Carrier server 65 may match each confirmation code included in the Requests File with a confirmation code stored, for example, in a reference number field associated with the corresponding shipment in the package tracking database 470. Once identified, the Carrier server 65 may, also at Block 512, transmit the identified tracking numbers to the Intermediary server 30. In addition to transmitting the tracking numbers, the Carrier server 65 may further provide an indication of the projected or anticipated delivery date associated with the first or all of the items associated with the Funds-Transfer Request.

The Intermediary server 30 may then, at Block 513, update the Funds-Transfer Request(s) with the tracking numbers received. In addition, according to one embodiment, the Intermediary server 30 may transmit a follow-up message to the consignee that: (1) reiterates the confirmation code, dollar amount, and terms and conditions of the transaction; and (2) provides the related tracking number(s), projected or anticipated delivery date(s), and/or the like. In one embodiment, the message may further include a link to be used to track the item(s).

In one embodiment, the shipper may be required to initiate shipment of the items associated with an issued confirmation code within a predetermined number of days (e.g., 60 days) from receiving the confirmation code, or else the confirmation code may expire. As a result, according to one embodiment, the Intermediary server 30 may periodically check the stored Funds-Transfer Requests to determine whether there is a tracking number(s) included in the Request (e.g., indicating whether shipment has been initiated). If, after the predefined period of time, no tracking number has been included, according to one embodiment, the Intermediary server 30 may send a notification to the shipper indicating that there is a Request without a corresponding shipment. In response, the shipper may be given a specified period of time to provide the tracking numbers, or other shipment information, before the Intermediary server 30 cancels the Funds-Transfer Request from the system (which would, in various embodiments, render the related confirmation code unusable). In one embodiment, the shipper may indicate how frequently they wish to receive "unmatched" notifications and/or how long they are given to respond to the notification.

At some point after shipment of the item(s) has commenced, one or more of the items associated with the shipment may be delivered to the consignee. (Block 514). According to one embodiment, because payment for the shipment may be automatically initiated at a time designated by the shipper, delivery of the item may not require that the carrier (e.g., a delivery driver employed by the carrier) interact with the consignee at all. This may allow a delivery driver to leave the item(s) for the consignee unattended. As one of ordinary skill in the art will recognize in light of this disclosure, this is just one potential benefit of use of the delivery payment system, as opposed to the standard COD system, wherein the consignee may be required to physically provide payment for the shipment to the carrier as a condition for receiving an item. This may result in potential delays and a potential inability to deliver an item at a particular time as a result of the consignee's absence.

Once the item(s) have been delivered, the Carrier server 65 may, at Block 515, notify the Intermediary server 30 of the delivery. According to one embodiment, this notification may be provided in real-time. For example, at the time of delivery, the delivery vehicle driver may use his or her handheld electronic device (e.g., a DIAD) to transmit a signal to the Carrier server 65 indicating that the delivery has been made. This signal may include, for example, the tracking number(s) of the items delivered. Upon receipt of the delivery notification, the Carrier server 65 may immediately, or soon thereafter, determine whether the delivered items correspond to a Funds-Transfer confirmation code and, if so, transmit an indication of the tracking number(s) associated with the delivered items and, in one embodiment, the Funds-Transfer confirmation code, to the Intermediary server 30. Alternatively, according to another embodiment, information regarding delivered items may be uploaded to the Carrier server 65 (e.g., from the various delivery vehicle driver devices) in batches, for example, at the end of the day or a particular shift. The Carrier server 65 may then search the uploaded information for Funds-Transfer confirmation codes, and then transmit the tracking number(s), and an indication that those items have been delivered, to the Intermediary server 30 for each confirmation code identified in the search.

Where multiple items are associated with the same Funds-Transfer Request (and thereby Funds-Transfer confirmation code), the Carrier server 65 may notify the Intermediary server 30 when the first item is delivered, and each item thereafter. Alternatively, according to another embodiment, the Carrier server 65 may only notify the Intermediary server 30 after all items associated with a particular Funds-Transfer Request have been delivered.

Upon receipt of the indication that an item or items have been delivered, the Intermediary server 30 may, at Block 516, determine whether it is the designated time to initiate payment of the shipment. In particular, according to one embodiment, the Intermediary server 30 may determine the timeframe according to which the shipper has requested the payment be made—e.g., immediately upon delivery, on a particular day of the month following the delivery of the item, 30 days following initiation of shipment, or the like. If the present time is not the designated time for payment, the Intermediary server 30 may wait until the designated time, at which point, the Intermediary server 30 may, at Block 517, transmit a payment request to the Clearinghouse server 40. In addition, according to one embodiment, the Intermediary server 30 may also transmit a reminder to the consignee indicating that payment is about to be made.

Upon receiving the payment request, the Clearinghouse server 40 may, at Block 518, establish a connection to the Consignee's Bank 70 and the Service Provider Bank 80 (e.g., via a connection between a Consignee Bank Server and a Service Provider Bank Server) in order to debit the consignee's bank account and credit the service provider's bank account. The Service Provider Bank 80 may thereafter consolidate multiple payments associated with the shipper from one or more Consignee Banks before initiating a single payment or credit to the shipper's bank account. According to one embodiment, debits/credits may be performed individually in association with each Funds-Transfer Request. Alternatively, debits/credits may occur in batches, for example, at the end of each day or week. As noted above, in one embodiment the carrier may be the party responsible for providing access to the delivery payment system (e,g., the service provider), in which case the Service Provider Bank 80 may be associated with the carrier.

According to one embodiment, if the consignee's bank account has insufficient funds for the shipment, the shipper may specify the number of attempts (e.g., 2, 3) that should be made to debit the account, before the shipper assumes responsibility for obtaining payment. The shipper may further define the amount of time the Clearinghouse server 40 should wait between attempts.

According to yet another embodiment, for a slight fee, the delivery payment system 50, Carrier, or some third-party insurer may guarantee the funds, in the event that the consignee has insufficient funds. In this exemplary embodiment, after the designated number of attempts, the guarantor may provide payment to the shipper. As noted above, according to one embodiment, where the payment is guaranteed by the carrier, the shipper may not be permitted to override the Clearinghouse server's recommendation not to proceed. According to yet another embodiment, a record of each attempt and resulting indication of insufficient funds may be stored in association with the consignee for later use by the shipper and/or Intermediary server 30.

Conclusion

As described above and as will be appreciated by one skilled in the art, embodiments of the present invention may be configured as a system, method, network entity or apparatus. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Embodiments of the present invention have been described above with reference to block diagrams and flowchart illustrations of methods, apparatuses (e.g., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as processor 205, 305, or 405 discussed above with reference to FIGS. 2, 3 and 4, respectively, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., processor 205, 305, or 405 of FIGS. 2, 3 and 4, respectively) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for facilitating payment for an item that is delivered from a shipper to a consignee by a carrier, the method comprising:

establishing (a) approved, (b) denied, and (c) not recommended criteria for classifying funds-transfer payment requests;

receiving a funds-transfer payment request, by an intermediary computer system, from the shipper for a funds-transfer payment;

automatically transmitting, by the intermediary computer system, the funds-transfer payment request to a clearinghouse computer system for authorization;

receiving, by the intermediary computer system, an indication from the clearinghouse computer system as to whether the funds-transfer payment is denied, approved, or not recommended based at least in part on the established criteria;

in response to receiving an indication that the funds-transfer payment is approved, automatically generating, by the intermediary computer system, a first confirmation code associated with the funds-transfer payment request;

in response to receiving an indication that the funds-transfer payment is not recommended, (a) allowing a shipper to override the not recommended indication and (b) automatically generating, by an intermediary computer system, a second confirmation code associated with the funds-transfer payment request following an override, wherein the second confirmation code is automatically configured to expire following a predetermined time frame;

automatically transmitting, by the intermediary computer system, the first or second confirmation code to the shipper and the consignee;

automatically determining whether a tracking number has been received in association with the first or second confirmation code within the predetermined time frame;

in response to determining that the tracking number has not been received in association with the first or second confirmation code within the predetermined time frame, automatically transmitting, by the intermediary computer system, a notification to the shipper;

determining, by the intermediary computer system, a designated period of time, provided to the shipper, in which the shipper is to provide the tracking number in response to automatically determining that the tracking number has not been received within the predetermined time frame;

receiving, by the intermediary computer system, a signal indicating that the item has been delivered as indicated by a mobile acquisition device; and automatically transmitting, at a designated time following delivery of the item, by the intermediary computer system, a payment initiation request to the clearinghouse computer system for initiation of the funds-transfer payment.

2. The method for facilitating payment of claim 1 further comprising:

automatically transmitting, by the intermediary computer system, the first or second confirmation code to a carrier computer system; and receiving, by the intermediary computer system, one or more tracking numbers and at least one scheduled delivery date associated with delivery of the item.

3. The method of claim 1, further comprising automatically rendering, by the intermediary computer system, the first or second confirmation code unusable in an instance in which the specified period of time expires prior to receipt of the tracking number which triggers cancelling the funds-transfer payment request for funds-transfer payment.

* * * * *